US010970955B2

(12) United States Patent
Gotanda et al.

(10) Patent No.: US 10,970,955 B2
(45) Date of Patent: *Apr. 6, 2021

(54) ACCOUNTING DEVICE AND CONTROL PROGRAM (71) Applicant: TOSHIBA TEC KABUSHIKI KAISHA, Tokyo (JP)

(72) Inventors: Tsuyoshi Gotanda, Tokyo (JP); Takashi Nakajima, Tokyo (JP); Akiko Susaki, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 49 days.

This patent is subject to a terminal disclaimer.

(21) Appl. No.: 16/377,137

(22) Filed: Apr. 5, 2019

(65) Prior Publication Data
US 2019/0236889 A1 Aug. 1, 2019

Related U.S. Application Data (63) Continuation of application No. 15/833,562, filed on Dec. 6, 2017, now Pat. No. 10,255,745.

(30) Foreign Application Priority Data

Dec. 8, 2016 (JP) .............................. JP2016-238566

(51) Int. Cl.
G07F 9/04 (2006.01)
G07F 9/08 (2006.01)
(Continued)

(52) U.S. Cl.
CPC ............. *G07F 9/04* (2013.01); *G06Q 20/202* (2013.01); *G07D 11/20* (2019.01); *G07D 11/40* (2019.01);
(Continued)

(58) Field of Classification Search
CPC ............ G06K 7/10762; G06Q 20/208; G06Q 20/209; G06Q 40/12; G07D 13/00;
(Continued)

(56) References Cited

U.S. PATENT DOCUMENTS 6,502,749 B1   1/2003  Snyder
7,720,710 B2 * 5/2010  Morrison ............. G07G 1/0018
                                                                705/16

(Continued)

FOREIGN PATENT DOCUMENTS

JP   2016-027449   2/2016
JP   2016-103189   6/2016

(Continued)

*Primary Examiner* — Seung H Lee
(74) *Attorney, Agent, or Firm* — Kim & Stewart LLP (57) ABSTRACT An accounting device according to an embodiment includes an input device that receives an instruction to start a job. A first display device includes a first screen facing a first direction towards a person who operates the input device. A change machine includes a depositing port for receiving money and a dispensing port for dispensing money. A second display device includes a second screen facing a second direction different from the first direction and towards a person who deposits money into the depositing port or receives money from the dispensing port. When the instruction received by the input device is to start a predetermined job that is different from the accounting transaction and that includes depositing money into the change machine or dispensing money from the change machine, the processor causes information supporting execution of the predetermined job to be displayed on the second screen.

20 Claims, 9 Drawing Sheets (51) Int. Cl.
    *G07G 1/06*     (2006.01)
    *G07G 1/01*     (2006.01)
    *G07G 1/00*     (2006.01)
    *G06Q 20/20*     (2012.01)
    *G07D 11/40*     (2019.01)
    *G07D 11/60*     (2019.01)
    *G07D 11/20*     (2019.01)
    *G07D 13/00*     (2006.01)
    *G06Q 40/00*     (2012.01)
    *G07G 5/00*     (2006.01)
    *G06K 7/10*     (2006.01)
    *G07F 9/00*     (2006.01)

(52) U.S. Cl.
    CPC .............. *G07D 11/60* (2019.01); *G07D 13/00* (2013.01); *G07F 9/08* (2013.01); *G07G 1/0009* (2013.01); *G07G 1/01* (2013.01); *G07G 1/06* (2013.01); *G06K 7/10762* (2013.01); *G06Q 20/208* (2013.01); *G06Q 20/209* (2013.01); *G06Q 40/12* (2013.12); *G07F 9/003* (2013.01); *G07G 1/0045* (2013.01); *G07G 5/00* (2013.01)

(58) Field of Classification Search
    CPC ........... G07F 19/00; G07F 9/003; G07F 9/04; G07F 9/08; G07G 1/00; G07G 1/0045; G07G 1/01; G07G 1/06; G07G 5/00
    See application file for complete search history.

(56)     References Cited

U.S. PATENT DOCUMENTS

| | | |
|---|---|---|
| 2003/0226891 A1 | 12/2003 | Sato |
| 2006/0255134 A1 | 11/2006 | Schmidt et al. |
| 2014/0224616 A1 | 8/2014 | Doi et al. |

FOREIGN PATENT DOCUMENTS

| | | |
|---|---|---|
| JP | 2016-103190 | 6/2016 |
| JP | 2016-126413 | 7/2016 |

\* cited by examiner

| JOB CODE | JOB NAME | DISPLAY SWITCHING F |
|---|---|---|
| 10000 | SALES REGISTRATION | 0 |
| 20000 | RETURN REGISTRATION | 0 |
| 30000 | CHANGE REPLENISHMENT | 1 |
| 40000 | CHANGE COLLECTION | 1 |
| 50000 | DAILY BALANCE INSPECTION | 0 |
| 60000 | DAILY BALANCE SETTLEMENT | 1 |
| 70000 | SETTING | 0 |
| ⋮ | ⋮ | ⋮ |

ACCOUNTING DEVICE AND CONTROL PROGRAM

CROSS-REFERENCE TO RELATED APPLICATION

This application is a continuation of U.S. patent application Ser. No. 15/833,562, filed Dec. 6, 2017, which application is based upon and claims the benefit of priority from Japanese Patent Application No. 2016-238566, filed Dec. 8, 2016, the entire contents of which are incorporated herein by reference.

FIELD

Embodiments described herein relate generally to an accounting device provided with a change machine and a control program for causing a computer to function as the accounting device.

BACKGROUND

An accounting device may be arranged so that a clerk and a customer face each other with a checkout counter therebetween. The clerk inputs data relating to accounting of commodities purchased by the customer. The customer deposits money into the change machine and takes out change from the change machine. In such an accounting device, a depositing port and a dispensing port of the change machine are provided at a customer side, which is opposite to a clerk work space side, with the checkout counter therebetween. For that reason, if the clerk intends to deposit currency into the change machine or dispense currency from the change machine, the clerk needs to go to the customer's side by moving around the checkout counter.

There is a replenishment job in which the clerk deposits money into the change machine. When the replenishment job is to be performed in the accounting device, for example, the amount of stored bills or the number of deficient bills according to denominations stored in the change machine may be displayed on a display device for the clerk. The clerk inserts necessary currency into a depositing port of the change machine based on displayed information and replenishes the change.

There is also a collection job in which the clerk dispenses money from the change machine. When the collection job is to be performed in the accounting device, for example, the number of stored bills or the number of surplus bills according to denominations stored in the change machine is displayed on the display device for the clerk. The clerk operates an input device based on displayed information and designates the number of collected bills according to denominations. Then, the bills according to the designated denominations are dispensed from the change machine. Then, the clerk collects the currency dispensed from the dispensing port.

In any one of the jobs, the clerk goes to the customer's side by moving around the checkout counter and inserts or collects the currency after confirming contents displayed on the display device at the work space. For that reason, for example, if it is necessary to confirm the displayed amount during the insertion job or collection job, the clerk must return to the clerk's work space and confirm the displayed amount and then move to the customer's side again. Accordingly, efficiency of performing the job is low.

DETAILED DESCRIPTION

Embodiments provide an accounting device which improves efficiency of depositing or dispensing currency from the change machine when a depositing port or a dispensing port is not accessible from the clerk's work space.

An accounting device according to an embodiment includes an input device that receives an instruction to start a job. A first display device includes a first screen facing a first direction towards a person who operates the input device. A change machine includes a depositing port for receiving money and a dispensing port for dispensing money. A second display device includes a second screen facing a second direction different from the first direction and towards a person who deposits money into the depositing port or receives money from the dispensing port. A processor processes an accounting transaction based on data input through the input device and an amount of money deposited into the change machine via the depositing port, including dispensing of change from the change machine. When the instruction received by the input device is to start a first job that is different from the accounting transaction and that includes depositing money into the change machine or dispensing money from the change machine, the processor causes information supporting execution of the first job to be displayed on the second screen. When the instruction received by the input device is to start a second job that does not include depositing money into the change machine or dispensing money from the change machine, the processor causes information supporting execution of the second job to be displayed on the first screen.

First Embodiment

Figure 1:
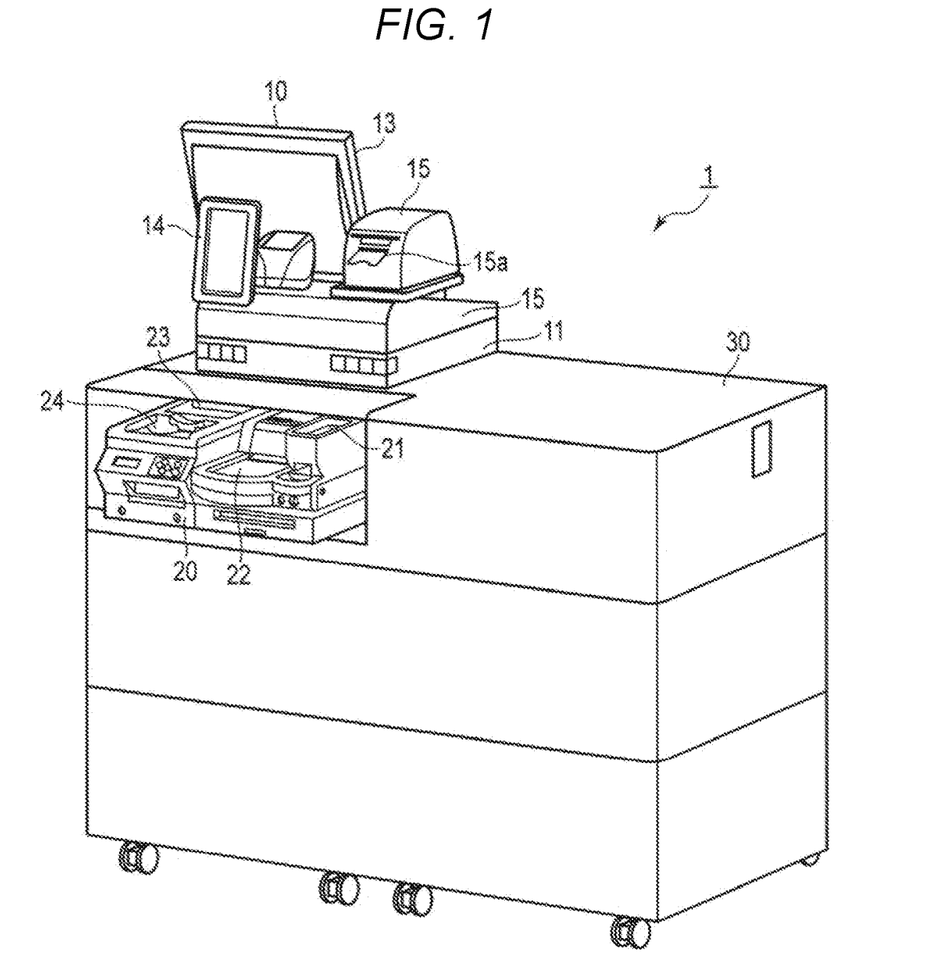
FIG. 1 is a perspective view illustrating an example configuration of an accounting device according to an embodiment.

A first embodiment will be described using FIGS. 1 to 8. FIG. 1 is a perspective view illustrating an example configuration of an accounting device 1 according to the embodiment. The accounting device 1 includes a point of sales (POS) terminal 10. In a sales transaction, the POS terminal 10 performs registration of commodity sales data and includes a change machine 20 that receives cash payment and dispenses change. The POS terminal 10 is positioned on the checkout counter 30. The change machine 20 is positioned in the checkout counter 30 so that a coin depositing port 21, a coin dispensing port 22, a bill depositing port 23, and a bill dispensing port 24 are exposed.

A clerk who operates the POS terminal 10 performs work on one side of the checkout counter 30, and a customer performs accounting with respect to the transaction on the other side of the checkout counter 30. In FIG. 1, a front side of the checkout counter 30 corresponds to a customer's side and a side opposite to the front side corresponds to the clerk's side. As illustrated, the checkout counter 30 is positioned so that the exposed coin depositing port 21, coin dispensing port 22, bill depositing port 23, and bill dispensing port 24 face the customer's side.

The POS terminal 10 includes a main body 11 equipped with a control circuit and various input and output devices such as a keyboard 12, a first touch panel 13, a second touch panel 14, a receipt printer 15, and the like.

The keyboard 12 is attached to the main body 11 for convenience of the clerk to operate the keyboard 12. In the keyboard 12, an accounting key, a closing key, and the like are provided for inputting data related to accounting. The accounting key is a key for giving an instruction to start accounting. The closing key is a key for giving an instruction to end accounting.

The first touch panel 13 includes a display device (first display device) such as a liquid crystal display and a touch sensor overlaid on a screen of the display device. The first touch panel 13 is positioned on the main body 11 so that a screen thereof is directed toward the clerk's side, thereby allowing the clerk to confirm information on the screen.

The second touch panel 14 also includes a display device (second display device) such as a liquid crystal display and a touch sensor overlaid on a screen of the display device. The second touch panel 14 is positioned on the main body 11 so that a screen thereof is directed toward the customer's side, thereby allowing the customer to confirm information on the screen. Specifically, the second touch panel 14 is positioned so as to be observed from a person (the customer or clerk or other worker) who performs depositing of currency into the depositing ports 21 and 23 and collecting of currency dispensed from the dispensing ports 22 and 24 of the change machine 20. That is, the first touch panel 13 and the second touch panel 14 face in opposite directions from each other, in an upper space of the checkout counter 30.

The receipt printer 15 prints receipt data with a printing head on a roll of receipt paper transported to a receipt issuing port 15a. The receipt printer 15 cuts the printed receipt paper discharged from the receipt issuing port 15a with a cutter and issues a receipt. The receipt printer 15 is positioned on the main body 11 so that the receipt issuing port 15a is directed to the customer's side, thereby allowing the customer to receive a receipt.

Accordingly, the depositing ports 21 and 23, the dispensing ports 22 and 24 of the change machine 20, and the receipt issuing port 15a all face the same direction as the screen of the second touch panel 14.

The change machine 20 includes a coin safe that stores coins according to denominations and a bill safe that stores bills by denominations. The change machine 20 identifies denominations of coins inserted into the coin depositing port 21 and stores the coins in the coin safe according to the denominations. Similarly, the change machine 20 identifies denominations of bills inserted into the bill depositing port 23 and stores the bills in the bill safe according to the denominations. The change machine 20 dispenses coins or bills stored in the coin safe or the bill safe to the coin dispensing port 22 or the bill dispensing port 24 according to a dispensing instruction from the POS terminal 10.

Figure 2:
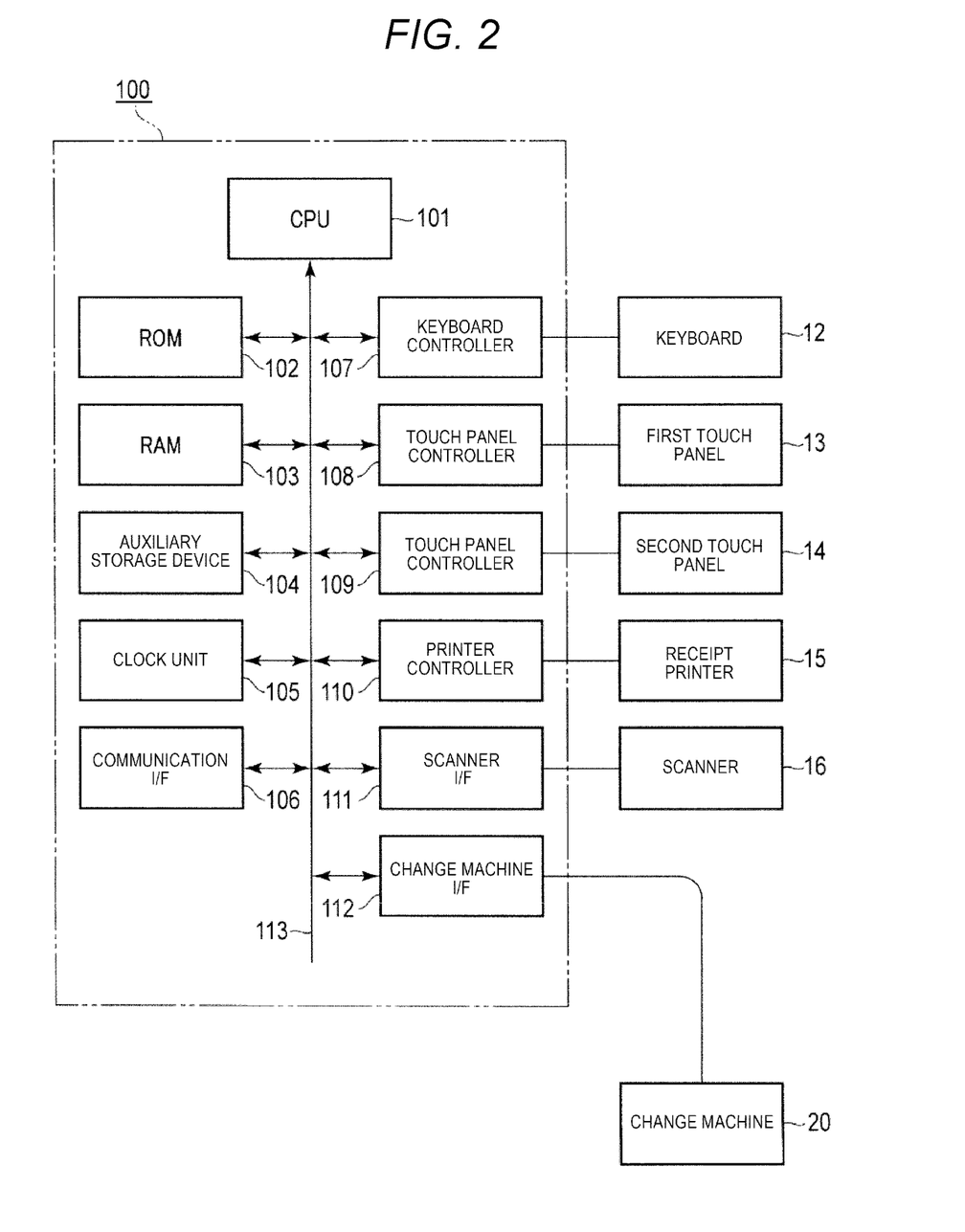
FIG. 2 is a block diagram illustrating an example circuit configuration of a POS terminal included in the accounting device.

FIG. 2 is a block diagram illustrating an example configuration of a control circuit 100 of the POS terminal 10 included in the accounting device. The POS terminal 10 includes, as elements of the control circuit 100, a central processing unit (CPU) 101, a read only memory (ROM) 102, a random access memory (RAM) 103, an auxiliary storage device 104, a clock unit 105, a communication interface 106, a keyboard controller 107, two touch panel controllers 108 and 109, a printer controller 110, a scanner interface 111, a change machine interface 112, and the like. These elements are connected with a system transmission path 113 including an address bus, a data bus, and the like. The CPU 101, the ROM 102, the RAM 103, and the auxiliary storage device 104 are connected with the system transmission path 113 to function as a computer of the POS terminal 10.

The CPU 101 corresponds to a central processor of the computer described above. The CPU 101 controls respective units so that various functions of the POS terminal 10 are implemented based on an operating system, middleware and/or an application program stored in the ROM 102 and the RAM 103.

The ROM 102 corresponds to a main storage unit of the computer described above. The ROM 102 stores the operating system described above. The ROM 102 may also store middleware or the application program described above. The ROM 102 may also store data referenced by the CPU 101 in performing various processing.

The RAM 103 corresponds to a main storage unit of the computer. The RAM 103 stores data that are referenced by the CPU 101 in performing various processing. The RAM 103 is utilized as so-called work area which temporarily stores data used in performing various processing by the CPU 101.

The auxiliary storage device 104 corresponds to an auxiliary storing unit of the computer. The auxiliary storage device 104 saves data used in performing various processing by the CPU 101 or data generated by processing in the CPU 101. As the auxiliary storage device 104, for example, an electric erasable programmable read-only memory (EEPROM), a hard disc drive (HDD), a solid state drive (SSD), or the like may be used.

The clock unit 105 functions as a time information source for the POS terminal 10. The CPU 101 determines the present time and date based on time information provided by the clock unit 105.

The communication interface 106 performs data communication with an external device such as a server connected through a communication network such as a local area network (LAN), according to a communication protocol.

The keyboard controller 107 acquires a key signal corresponding to a key operated by an operator from the keyboard 12.

The touch panel controller 108 controls the display device of the first touch panel 13. The touch panel controller 108 also detects a touch position coordinates on the screen by a signal from a touch sensor of the first touch panel 13.

The touch panel controller 109 controls the display device of the second touch panel 14. The touch panel controller 109 also detects a touch position coordinates on the screen by a signal from a touch sensor of the second touch panel 14.

The printer controller 110 outputs receipt data to the receipt printer 15 and controls printing and issuing operation of a receipt.

The scanner interface 111 connects a scanner 16 which optically reads a code symbol such as a barcode or a two-dimensional (QR) code. The scanner interface 111 sends and receives a data signal for the scanner 16 to thereby acquire data of the code symbol read by the scanner 16. The scanner 16 may be a stationary scanner and may also be a hand-held type scanner.

The change machine interface 112 connects the change machine 20. The change machine interface 112 sends and receives a data signal for the change machine 20 to thereby acquire data indicating money inserted into the change machine 20. The change machine interface 112 transmits data related to dispensing money such as change data to the change machine 20 and controls dispensing of money from the change machine 20.

Figure 3:
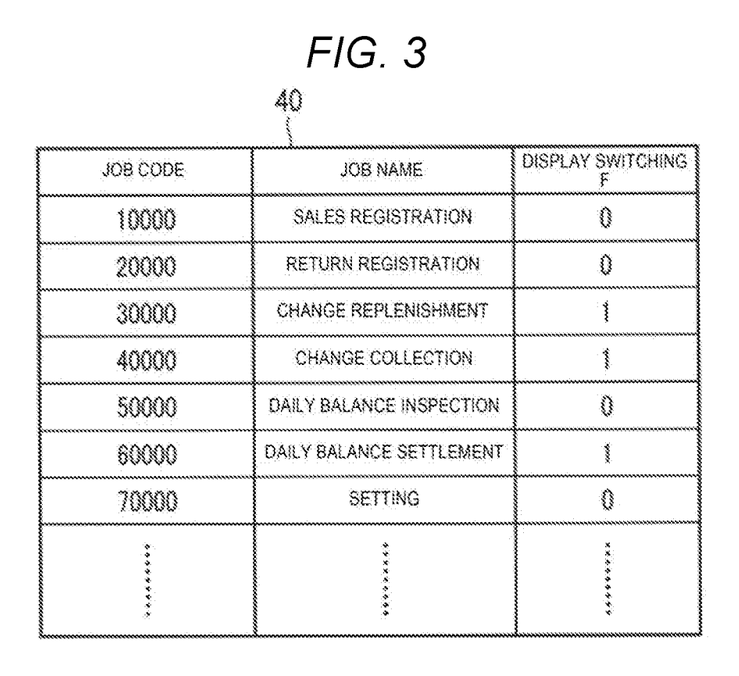
FIG. 3 is a diagram illustrating an example data structure of a job table stored in an auxiliary storage device of the POS terminal.

A job table 40 having a data structure illustrated in FIG. 3 is stored in the auxiliary storage device 104.

In the job table 40, names of various jobs that can be executed by the POS terminal 10 and associated display switching flags are stored. Job codes are uniquely allocated to each of the jobs. The display switching flag is 1-bit data specifying whether information supporting execution of the corresponding job is to be displayed on the first touch panel 13 or is to be displayed on the second touch panel 14. According to the first embodiment, the display switching flag is set as "0" for execution of the job that requires information to be displayed on the first touch panel 13. The display switching flag is set as "1" for execution of the job that requires information to be displayed on the second touch panel 14. In the example of the job table 40 illustrated in FIG. 3, the display switching flag is set as "1" for "change replenishment", "change collection", and "daily balance settlement." The display switching flag is set as "0" for "sales registration", "returned commodity registration", "daily balance inspection", "setting." Whether to set the display switching flag as "1" or "0" for a job is arbitrary but typically the display switching flag is set as "1" for a job in which the clerk inserts cash into the change machine 20 or collects cash dispensed from the change machine 20.

Here, information supporting execution of the job corresponds to, for example, guidance for an operation method to the operator. For example, in a case of the change replenishment job or the change collection job, information such as number of stored bills, the number of deficient bills, and the number of surplus bills for each denomination of currency stored in the change machine 20 also corresponds to information supporting execution of the job.

In the change machine 20, the number of coins and the number of bills respectively stored in the coin safe and the bill safe are counted by denominations. The upper limit threshold for bills and the lower limit threshold for bills are set per denomination. If the number of stored bills of a certain denomination is less than the lower limit threshold, the change machine 20 calculates the number of bills needed by subtracting the number of stored bills from the lower limit threshold for the corresponding denomination, and sets the difference as the number of deficient bills. Similarly, if the number of stored bills of a certain denomination is greater than the upper limit threshold, the change machine 20 calculates the number of bills to be collected by subtracting the upper limit threshold from the number of stored bills of the corresponding denomination, and sets the difference as the number of surplus sheets. The upper limit threshold and the lower limit threshold are arbitrary and can be appropriately set.

A method of calculating the number of deficient sheets and the number of surplus sheets is not limited to the methods described above. The number of stored sheets, the number of deficient sheets, and the number of surplus sheets may be managed by, for example, the POS terminal 10 instead of the change machine 20.

Figure 4:
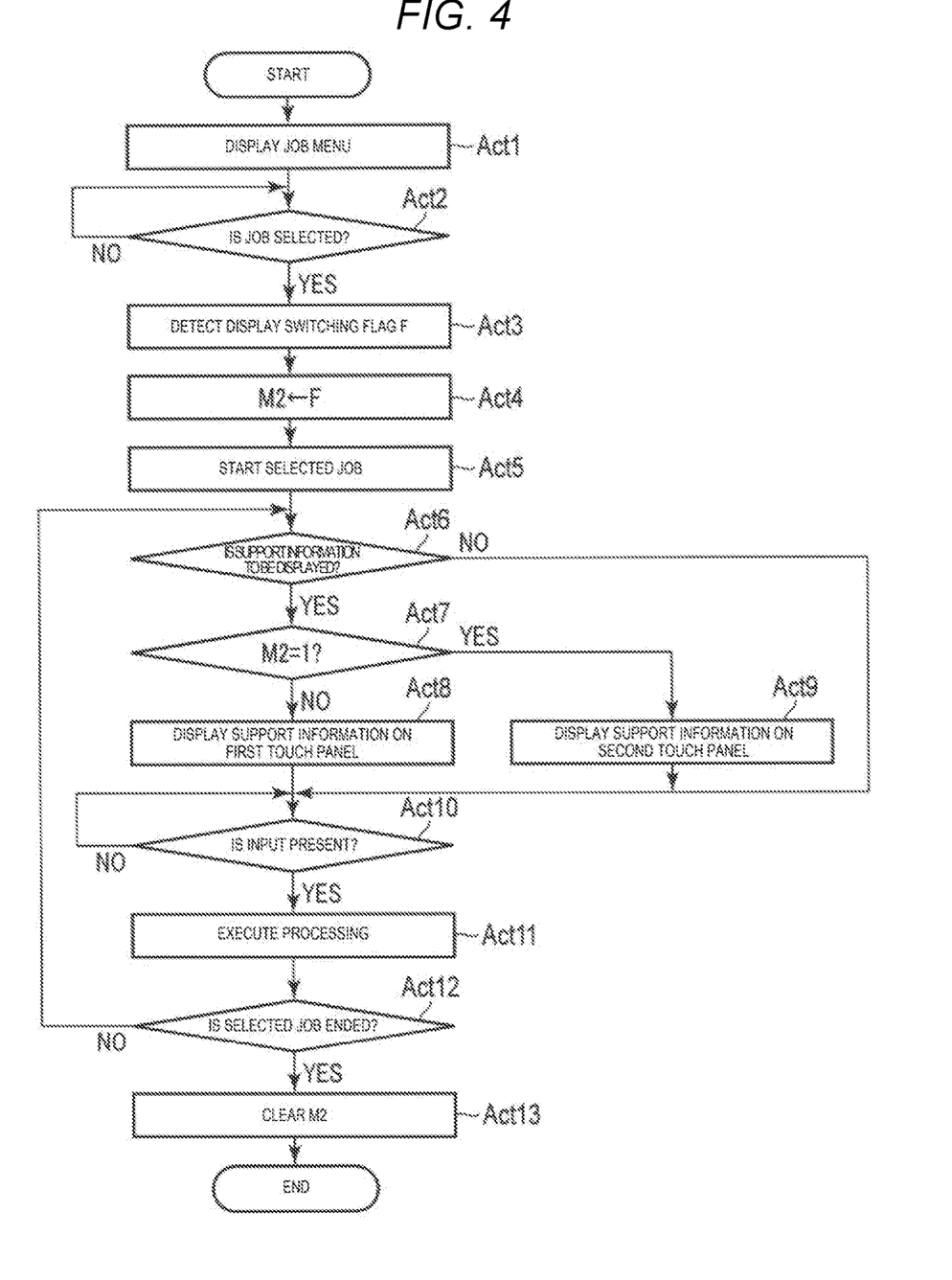
FIG. 4 is a flowchart illustrating an example procedure executed according to a control program by a CPU of the POS terminal.

FIG. 4 is a flowchart illustrating an example procedure executed according to a control program stored in the ROM 102 or the auxiliary storage device 104 by the CPU 101. When the operator performs a sign-on operation, the CPU 101 starts processing of the procedure illustrated in the flowchart of FIG. 4. The sign-on operation is not particularly limited. For example, the sign-on operation may be performed in such a way that the clerk operates the sign-on keys arranged in the keyboard 12 and scans a bar code symbol that is unique to the clerk, using the scanner 16. The sign-on operation is performed such that the clerk's code is stored in a memory area M1. The memory area M1 is formed in the RAM 103.

The processing which will be described in the following is an example and various processing capable of obtaining the same result can be appropriately utilized.

First, the CPU 101 causes a job menu to be displayed on the first touch panel 13, as processing of Act1. A list of the job names stored in the job table 40 is included in the job menu. The clerk who caused the job menu to be displayed touches a job name of a job to be executed.

The CPU 101 waits for selection of any of the job names from the job menu as processing of Act2. When a single job name is selected by a signal of a touch sensor input to the touch panel controller 108 (YES in Act2), the CPU 101 retrieves the job table 40 and detects the display switching flag F which is set in association with the job code of the touched job name, as processing of Act3. The CPU 101 writes the value of the display switching flag in a memory area M2, as processing of Act4. The memory area M2 is formed in the RAM 103.

The CPU 101 starts a program of the job corresponding to the selected job name, as processing of Act5. The CPU 101 executes processing of Act6 to Act13 which will be described in the following.

In Act6, the CPU 101 confirms whether information supporting execution of the job is to be displayed or not, based on, for example, the application program corresponding to the selected job. If it is confirmed that the information is not to be displayed (NO in Act6), the CPU 101 proceeds to Act10. If the information is to be displayed (YES in Act6), the CPU 101 proceeds to Act7.

In Act7, the CPU 101 checks a value of the memory area M2. If a value of the memory area M2 is "0" (NO in Act7), the CPU 101 proceeds to Act8. If the value of the memory area M2 is "1" (YES in Act7), the CPU 101 proceeds to Act9.

In Act8, the CPU 101 causes the information supporting execution of the job to be displayed on the first touch panel 13. In Act9, the CPU 101 causes the information supporting execution of the job to be displayed on the second touch panel 14. When processing of Act8 or Act9 is ended, the CPU 101 proceeds to Act10.

In Act10, the CPU 101 waits for an input from an input device. In the POS terminal 10, the keyboard 12, the first touch panel 13, the second touch panel 14, and the scanner 16 are included as the input device. When an input from the input device is received (YES in Act10), the CPU 101 proceeds to Act11.

In Act11, the CPU 101 executes processing according to the input from the input device. Processing described above may be different depending on the particular job and contents of the input and thus, detailed description thereof will be omitted. When processing described above is ended, the CPU 101 proceeds to Act12.

In Act12, the CPU 101 determines whether the job is ended by processing in Act11 or not. When it is determined that the job is not ended (NO in Act12), the CPU 101 returns to Act6. Processing subsequent to Act6 is repeated in the same manner as above-description.

By doing this, each time there is an input from the input device, the CPU 101 executes processing according to the input. If the value of the memory area M2 is "0", the CPU 101 causes the information supporting execution of the job to be displayed on the first touch panel 13. In contrast, if the value of the memory area M2 is "1", the CPU 101 causes the information supporting execution of the job to be displayed on the second touch panel 14. As such, as a result of execution of the processing according to the input, when it is determined that the job is ended (YES in Act12), the CPU 101 proceeds to Act13.

In Act13, the CPU 101 clears the memory area M2. Thus, the CPU 101 ends information processing according to the control program.

Next, a specific example of information processing illustrated in the flowchart of FIG. 4 will be described.

First, a case where the clerk operates the POS terminal 10 and performs a sales registration job of the commodity purchased by the customer is described. The clerk who conducts the sales registration job touches a job name of "sales registration" from the job menu. Then, "0" is written into the memory area M2. The CPU 101 starts information processing based on the program of the sales registration job.

First, the CPU 101 initializes a memory area M3 for sales registration. The memory area M3 is formed in the RAM 103. The CPU 101 causes guidance for guiding sales registration operation to be displayed. The guidance is displayed on the first touch panel 13 because "0" is written into the memory area M2.

The clerk operates an input device (keyboard 12, first touch panel 13, or scanner 16) according to the guidance displayed on the first touch panel 13 and inputs sales data of the commodity purchased by the customer to the POS terminal 10. Then, the CPU 101 performs registration of sales data of the commodity in the memory area M3 and causes a name of the commodity, an amount of money, and the like to be displayed on the first touch panel 13 and the second touch panel 14. The CPU 101 causes guidance for guiding an accounting operation to be displayed. The guidance is displayed on the first touch panel 13 because "0" is written into the memory area M2.

When inputting of sales data of the commodity purchased by the customer is ended, the clerk operates an accounting key according to guidance displayed on the first touch panel 13. Then, the CPU 101 calculates a total amount of the commodity purchased by the customer based on sales data of the commodity stored in the memory area M3. The CPU 101 causes the total amount to be displayed on the first touch panel 13 and the second touch panel 14. The CPU 101 causes the guidance for urging the customer to pay a price to be displayed. The guidance is displayed on the first touch panel 13 because "0" is written into the memory area M2.

The clerk urges the customer to pay the price according to the guidance displayed on the first touch panel 13, and also performs a commodity bagging work. On the other hand, the customer inserts bills or coins into the depositing ports 21 and 23 of the change machine 20 in order to pay the total amount displayed on the second touch panel 14 in cash. The amount of money of the bills or coins deposited into the change machine 20 is notified to the CPU 101 and is displayed on the first touch panel 13 and the second touch panel 14.

When it is confirmed that the amount greater than or equal to the total amount of money is deposited into the change machine 20, the clerk operates a closing key. Then, the CPU 101 calculates a change amount from the total amount and a paid amount, that is, an amount of money deposited into the change machine 20. The CPU 101 causes the change amount to be displayed on the first touch panel 13 and the second touch panel 14. In this case, if change is required, the CPU 101 outputs change data to the change machine 20. The CPU 101 generates receipt data to be output to the receipt printer 15 and controls printing and issuing operation of a receipt. By doing this, the receipt is issued from the receipt issuing port 15a in the accounting device 1. If change is required, the coins or the bills as the change are paid out from the dispensing ports 22 and 24 of the change machine 20. The customer receives the bagged commodity from the clerk and obtains the receipt and change by himself/herself. Thus, a sales registration job for a single customer is ended.

If a sales registration job for a commodity purchased by a next customer is required, the clerk performs a subsequent sales registration operation. The operation is not particularly limited. For example, the clerk may operate a key disposed in the keyboard 12 to perform the subsequent operation. When the subsequent operation is performed, the CPU 101 initializes the memory area M3. The CPU 101 causes guidance for guiding the sales registration operation to be displayed again. The guidance is displayed on the first touch panel 13 because "0" is written into the memory area M2.

On the other hand, if the sales registration job is ended, the clerk performs the sign-off operation. The sign-off operation is not particularly limited. For example, the clerk may operate a sign-off key in the keyboard 12 to perform the sign-off operation. When the sign-off operation is performed, the memory area M2 is cleared. The POS terminal 10 proceeds to a sign-off state.

The computer which uses the CPU 101 functions as a control unit which performs accounting based on data input through the input device and the amount of money input into the change machine 20, controls dispensing of change from the change machine 20, and controls display of the first display device and the second display device.

In addition, in the sales registration job described above, the clerk does not touch cash paid by the customer or change paid out from the change machine 20. Accordingly, it is sanitary and thus, the accounting device 1 can be preferably applied to a store that sells food such as bread, doughnuts, or cakes.

Next, as an example of a job that includes depositing of money into the change machine 20 in processing other than accounting, a job for replenishing the change machine 20 with change preparation money will be described. The clerk who conducts the replenishment job touches the job name "change replenishment" from the job menu. Then, because the display switching flag value is "1" for the corresponding job in the job table 40, "1" is written into the memory area M2. The CPU 101 starts information processing based on the application program for the change replenishment job.

Figure 5:
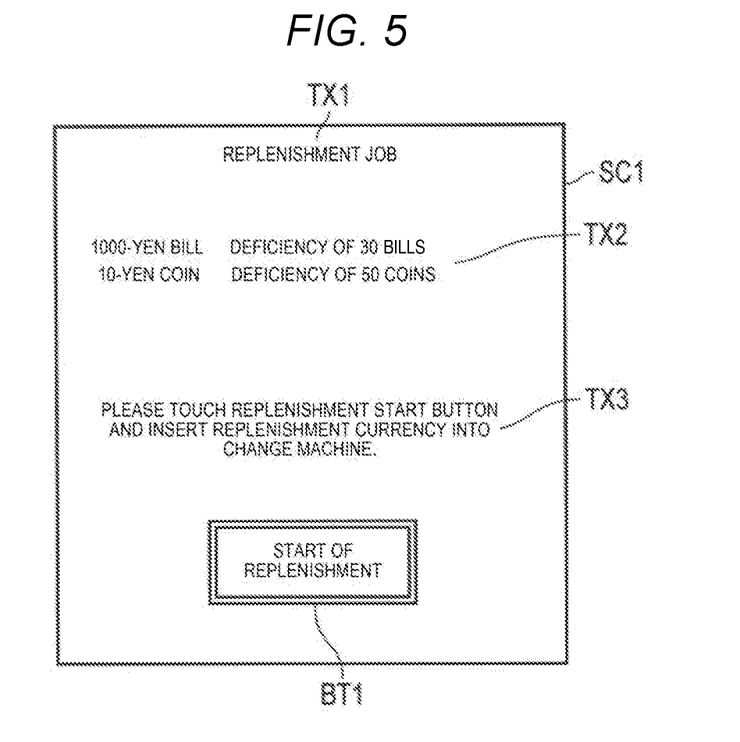
FIG. 5 is a diagram illustrating an example of a screen displayed on a second touch panel when a replenishment job is started in the POS terminal.

First, the CPU 101 causes guidance for giving an instruction to start replenishment to be displayed. The guidance is displayed on the second touch panel 14 because "1" is written into the memory area M2.

FIG. 5 is an example of a screen SC1 including the guidance for giving an instruction to start replenishment. As illustrated, text TX1, TX2, and TX3 and an image of a replenishment start button BT1 are displayed on the screen SC1. The text TX1 indicates that the replenishment job is being performed. The text TX2 indicates the denomination of the currency which needs replenishment and the number of deficient bills. The text TX3 indicates guidance that guides a replenishment start operation.

The clerk who touched the job name "change replenishment" moves from the clerk's side to the customer's side, bringing cash which is for replenishing the change machine 20. When the screen SC1 displayed on the second touch panel 14 is confirmed, the clerk touches the replenishment start button BT1. Then, the change machine 20 is activated and the clerk deposits the coins or the bills of the denominations displayed on the text TX2 in an amount greater than or equal to the number of deficient bills, into the coin depositing port 21 or the bill depositing port 23. The coins or the bills deposited described above are stored in the coin safe or the bill safe of the change machine 20 according to denominations.

Figure 6:
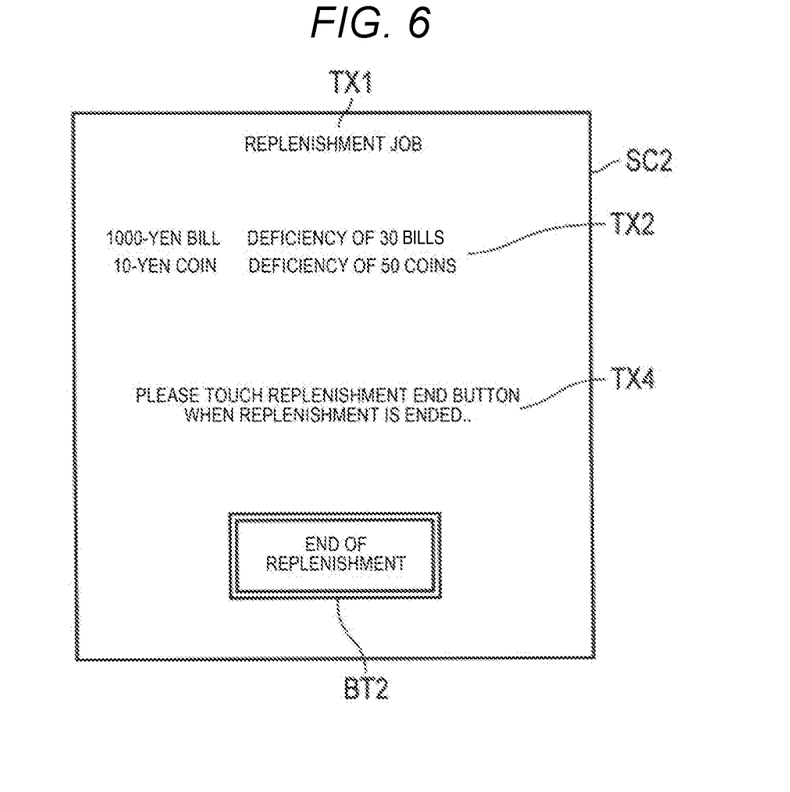
FIG. 6 is a diagram illustrating an example of a screen displayed on the second touch panel when the replenishment job is ended in the POS terminal.

The CPU 101 that activated the change machine 20 causes guidance for giving an instruction to end replenishment to be displayed. The guidance is displayed on the second touch panel 14 because "1" is written into the memory area M2.

FIG. 6 is an example of a screen SC2 including the guidance for giving an instruction to end replenishment. As illustrated, text TX1, TX2 and TX4 and an image of a replenishment end button BT2 are displayed on the screen SC2. The text TX1 and TX2 of the screen SC 2 are the same as text TX1, TX2 of the screen SC1. The text TX4 indicates guidance for guiding a replenishment end operation.

The clerk who ended the replenishment operation touches a replenishment end button BT2 of the screen SC2 displayed on the second touch panel 14. Then, the CPU 101 controls the receipt printer 15 to print the denomination of the currency which was replenished in the change machine 20 and the number of replenished bills of the currency. The CPU 101 stops the change machine 20. Thus, the change replenishment job is ended.

Accordingly, the clerk who ended the change replenishment job collects the receipt paper issued from the receipt issuing port 15a and can confirm the denomination of the replenished currency and the number of replenished bills of the currency.

Figure 7:
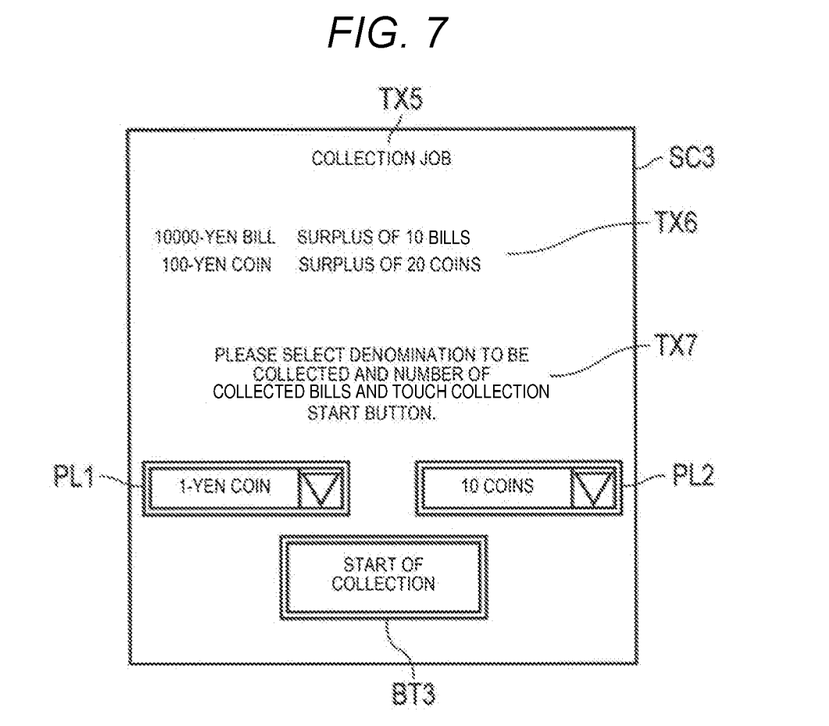
FIG. 7 is a diagram illustrating an example of a screen displayed on the second touch panel when a collection job is started in the POS terminal.

Next, as an example of a job including dispensing of money from the change machine 20 in processing other than accounting, a job for collecting change preparation money from the change machine 20 will be described. The clerk who conducts the collection job touches the job name "change collection" from the job menu. Then, because the display switching flag value is "1" for the corresponding job in the job table 40, "1" is written into the memory area M2. The CPU 101 starts information processing based on the application program of the change collection job.

First, the CPU 101 causes guidance for giving an instruction to start collection to be displayed. The guidance is displayed on the second touch panel 14 because "1" is written into the memory area M2.

FIG. 7 is an example of a screen SC3 including the guidance for giving an instruction to start collection. As illustrated, text TX5, TX6, and TX7, pull down lists PL1 and PL2, and an image of a collection start button BT3 are displayed on the screen SC3. The text TX5 indicates that the collection job is being performed. The text TX6 indicates the denomination of the currency which needs collection and the number of surplus bills. The text TX7 indicates guidance that guides a collection start operation. The pull down list PL1 displays a list of currency denominations. The pull down list PL2 displays a selectable number of bills to be collected, for example, ten sheets.

The clerk who touched the job name "change collection" moves from the clerk's side to the customer's side, bringing, for example, a bag for storing currency collected from the change machine 20. When the screen SC3 displayed on the second touch panel 14 is confirmed, the clerk designates the denomination to be collected and the number of collected bills from the pull down lists PL1 and PL2 and touches the collection start button BT3. Then, the change machine 20 is activated and thus, currency of the designated denomination is dispensed in the designated number. For example, when the clerk designates the denomination of "10000-yen bill" from the pull down list PL1 and designates the number of collected bills to be "10 sheets" from the pull down list PL2, ten 10000-yen bills are dispensed from the bill dispensing port 24. Similarly, when the clerk designates the denomination of "100-yen coin" from the pull down list PL1 and designates the number of collected coins to be "20 coins" from the pull down list PL2, twenty 100-yen coins are dispensed from the coin dispensing port 22. The clerk collects the dispensed bills or coins from the bill dispensing port 24 or the coin dispensing port 22 and stores the bills or coins in the bag or the like.

Figure 8:
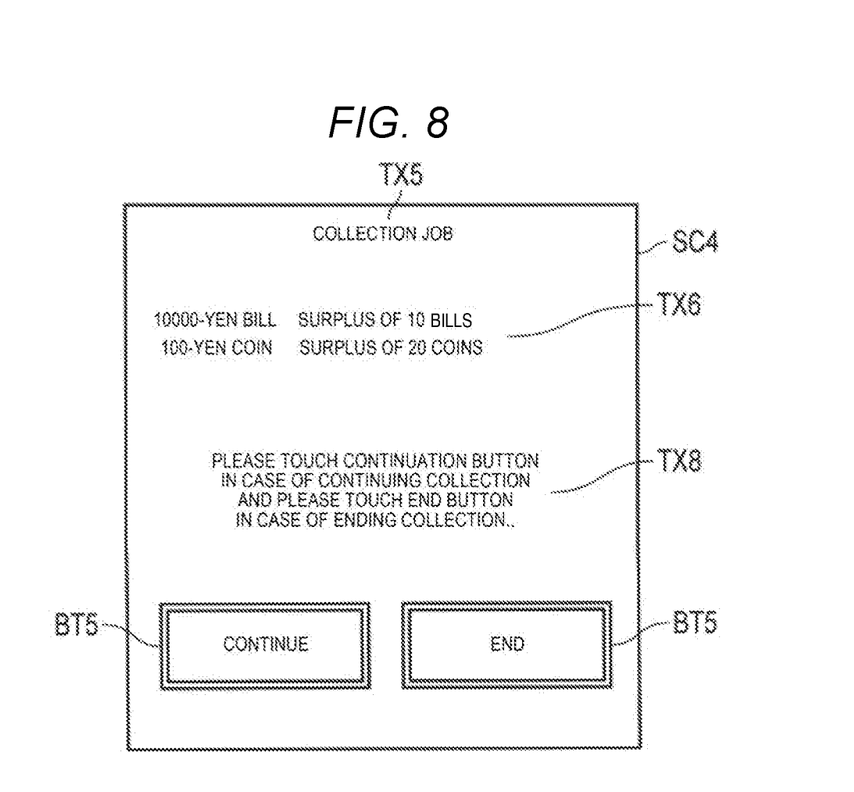
FIG. 8 is a diagram illustrating an example of a screen displayed on the second touch panel when the collection job is ended in the POS terminal.

The CPU 101 which gives an instruction to the change machine 20 causes guidance, which requests input whether to continue or end collection, to be displayed. The guidance is displayed on the second touch panel 14 because "1" is written into the memory area M2.

FIG. 8 is an example of a screen SC4 including the guidance for urging whether to continue or end the collection job. As illustrated, text TX5, TX6, and TX8 and images of a continue button BT4 and an end button BT5 are displayed on the screen SC4. The text TX5 and TX6 of the screen SC4 are the same as the text TX5 and TX6 of the screen SC3. The text TX8 indicates guidance that guides an operation which continues or ends the collection job.

The clerk, who ended collection of the designated denomination, next determines whether an additional denomination needs to be collected or not. If an additional denomination needs to be collected, the clerk touches the continue button BT4. Then, the CPU 101 executes processing based on the input of the continue button and causes the screen SC3, which includes guidance for giving an instruction to start collection described above, to be displayed in the second touch panel 14. Similar to the above-description, the clerk designates the denomination and the number of bills to be collected from the pull down lists PL1 and PL2 and touches the collection start button BT3.

On the other hand, if there are no additional denominations to be collected, the clerk touches the end button BT5. Then, the CPU 101 controls the receipt printer 15 to print the denomination of currency dispensed from the change machine 20 and the number of dispensed bills of the currency. The CPU 101 stops the change machine 20. Thus, the change collection job is ended.

Accordingly, the clerk who ended the change collection job can collect the receipt paper is sued from the receipt issuing port 15a and confirm the denomination of currency collected from the change machine 20 and the number of collected bills of the currency.

As such, in the accounting device 1 of the first embodiment, the depositing ports 21 and 23 and the dispensing ports 22 and 24 of the change machine 20 attached to the checkout counter 30 are directed toward the customer's side which is opposite to the clerk's side, partitioned by the checkout counter 30. The screen of the first touch panel 13 of the POS terminal 10 faces the clerk's side and the screen of the second touch panel 14 faces the customer's side. If an instruction to execute certain jobs, which are determined in advance, including jobs that involve depositing money into the change machine 20 or dispensing money from the change machine 20 other than accounting, the POS terminal 10 causes information supporting execution of the job to be displayed on the second touch panel 14.

Accordingly, the clerk who is in charge of the job that involves depositing of money into the change machine 20 or dispensing of money from the change machine 20 is able to execute the job and deposit the money or dispense the money at the customer's side while receiving support of information displayed on the second touch panel 14. As a result, even if it is necessary to confirm displayed information during the depositing job or the collection job, the clerk is able to confirm the information while staying on the customer's side. Accordingly, the clerk does not have to return to the clerk's side to confirm the displayed contents. Thus, the job can be efficiently performed.

The receipt printer 15 is also positioned in such a way that the receipt issuing port 15a is directed toward the customer's side. Accordingly, even if receipt paper on which contents of the job are printed is issued from the receipt printer 15, the clerk can receive the issued receipt paper while staying on the customer's side. Accordingly, the clerk positioned on the customer's side does not have to return to the clerk's side in order to collect the receipt paper.

In FIG. 1, the POS terminal 10 is positioned immediately above the change machine 20. However, the POS terminal 10 may be placed at a different position. Further, in FIG. 1, the checkout counter 30 is between the customer's side and the clerk's. However, the customer's side is not limited to the side opposite to the clerk's side as long as the customer's side is different from the clerk's side. If the customer's side is not the side opposite to the clerk's side, the change machine 20 is positioned in a state where the coin depositing port 21, the coin dispensing port 22, the bill depositing port 23, and the bill dispensing port 24 are facing the customer's side. The second touch panel 14 is also positioned so that the customer or clerk at the customer's side can confirm the displayed contents of the screen. By doing as described above, it is possible to provide the accounting device in which the work of depositing of money into a change machine or the work of dispensing of money from the change machine of which the depositing port or the dispensing port is not present at the clerk's side can be efficiently performed.

Second Embodiment

Next, a second embodiment will be described using FIG. 9. The second embodiment differs from the first embodiment with respect to part of the information processing executed by the CPU 101 of the POS terminal 10 according to the control program. Other parts of the information processing are the same as those of the first embodiments and thus, FIG. 1 to FIG. 3 and FIG. 5 to FIG. 8 may be applied to the second embodiment as they are and detailed description thereof will be omitted.

Figure 9:
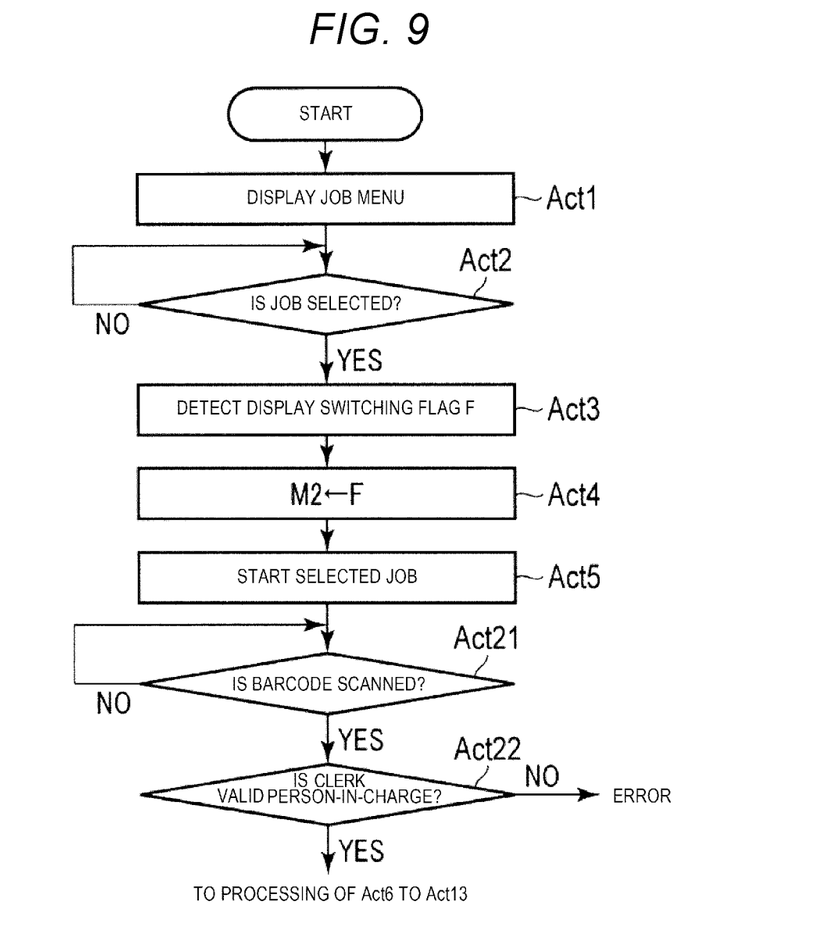
FIG. 9 is a flowchart illustrating an example procedure executed according to a control program by the CPU of the POS terminal according to a second embodiment.

FIG. 9 is a flowchart schematically illustrating an example procedure executed according to a control program by the CPU 101 of the POS terminal 10 in a second embodiment. The same processing blocks as those of FIG. 4 are assigned the same reference numerals.

As can be seen from a comparison of FIG. 9 with FIG. 4, the procedure from Act1 to Act5 is the same as that of the first embodiment. In the second embodiment, after a job program specified by a selected job name is started, in Act5, the CPU 101 waits until the barcode is scanned by the scanner 16, in Act21. When it is detected that the barcode is scanned, the CPU 101 determines whether a code obtained by analyzing the bar code coincides with the clerk's code used for identifying a clerk who is signed-on, in Act22. If it is determined that the code and the clerk's code do not coincide with each other (NO in Act22), the CPU 101 determines that the input of the scanned barcode is an erroneous input. Processing after the scanned barcode is determined to be an erroneous input is not particularly limited. Waiting for a next scanning input may be allowed or the selected job may be ended.

If it is determined that the code obtained by analyzing the bar code coincides with the clerk's code used for identifying a clerk who signed-on in Act22 (YES in Act22), the CPU 101 executes processing of Act6 to Act13 described above.

As such, in the second embodiment, only the clerk who signed on to the POS terminal 10 can execute the job selected from the job menu. Accordingly, for example, when the clerk who signed on is away from the work space, another clerk or the like cannot illegally acquire cash from the change machine 20 by executing the job accompanied by dispensing of money from the change machine 20. Accordingly, it is possible to provide an accounting device with high security.

In the following, a modification example of the embodiments described above will be described. For example, 2-bit data may be set in the job table instead of the 1-bit display switching flag, in the embodiments. If the set data is "10" or "11", information supporting execution of the job is displayed on both the first touch panel 13 and the second touch panel 14. By doing as described above, information supporting execution of the job is displayed on both the first touch panel 13 and the second touch panel 14 and thus, the operator can obtain the same information from any of the touch panels.

For example, a display device and a pointing device may be provided, instead of each of the first touch panel 13 and the second touch panel 14. Even in such a configuration, the same effects can be attained.

The POS terminal 10 is generally provided in a state where a program such as a control program is stored in the ROM 102. However, the POS terminal 10 is not limited thereto and the POS terminal 10 may be provided in a state where the program is not stored in the ROM 102 or another control program is stored in the ROM 102 or the auxiliary storage device 104. In this case, the control program or the like assigned separately from the POS terminal may be written into a storage device equipped in the POS terminal 10 according to an operation of a user or the like, otherwise another control program described above may be rewritten into the storage device. The control program or the like can be provided by storing the control program in a removable recording medium or performing communication through a network. Form of the recording medium does not matter as long as the recording medium is a CD-ROM, a memory card, or the like in which the program can be stored and from which an apparatus is capable of reading the program. Functions obtained by installing or downloading the program may be ones that implement functions of an apparatus by being cooperated with an operating system (OS) or the like within the apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An accounting device comprising:
a first display device that includes a first screen facing a first direction towards an operator and configured to accept a touch input;
a change machine that includes a depositing port for receiving money and a dispensing port for dispensing money, and faces a second direction different from the first direction;
a second display device that includes a second screen that is configured to accept a touch input and faces the second direction; and
a processor configured to:
upon receipt of a first touch input via the first screen, determine whether the first touch input is made to start a first job performed on the change machine, or to start a second job that is different from the first job,
when the first touch input is made to start the first job, control the second display device to display a first button on the second screen, and
when the first touch input is made to start the second job, control the first display device to display information for supporting execution of the second job on the first screen,
wherein, when the first touch input is made to start the first job and a second touch input is made on the first button displayed on the second screen, the processor enables the change machine to receive or dispense money, and controls the second display device to display a second button for completing the first job on the second screen, and
when a third touch input is made on the second button displayed on the second screen, the processor disenables the change machine from receiving or dispensing money.

2. The device according to claim 1, further comprising:
a printer, wherein
when the third touch input is made on the second button displayed on the second screen, the processor controls the printer to print a receipt indicating the money received or dispensed by the change machine.

3. The device according to claim 1, wherein
the first screen and the second screen face opposite each other on an upper space of a checkout counter.

4. The device according to claim 1, wherein
the information for supporting execution of the second job includes a button image for receiving an input relating to the execution of the second job.

5. The device according to claim 1, further comprising:
a printer having an issuance port for issuing a receipt that faces the second direction, wherein
the processor is further configured to
perform an accounting transaction based on data input via the first screen and an amount of money deposited into the change machine, and
control the printer to print details of the accounting transaction on the receipt.

6. The device according to claim 1, further comprising:
a scanner configured to scan a barcode, wherein
when the first touch input is made to start the first job, the processor:
waits for the scanner to scan the barcode,
determines whether a code corresponding to the barcode coincides with an identification of the operator, and
prevents execution of the first job for dispensing money when the code corresponding to the barcode does not coincide with the identification.

7. The accounting device according to claim 1, wherein the first job includes
replenishing the change machine with cash.

8. A method of controlling an accounting device having a first display device that faces a first direction towards an operator and includes a touch panel, a second display device including a touch panel and facing a second direction different from the first direction, and a change machine for receiving or dispensing money, the change machine facing the second direction, the method comprising:
receiving a first touch input via the first display device;
determining whether the first touch input is made to start a first job performed on the change machine, or to start a second job other than the first job;
when the first touch input is made to start the first job, displaying a first button on the second display device,
when a second touch input is made on the first button displayed on the second display device, enabling the change machine to receive or dispense money, and displaying a second button for completing the first job on the second display device, and
when a third touch input is made on the second button displayed on the second display device, disenabling the change machine from receiving or dispensing money; and
when the first touch input is made to start the second job, displaying information for supporting execution of the second job on the first display device.

9. The method according to claim 8, further comprising:
when the third touch input is made on the second button displayed on the second display device, printing a receipt indicating the money received or dispensed by the change machine.

10. The method according to claim 8, wherein
the change machine has a depositing port for receiving money and a dispensing port for dispensing money, both of which face the second direction.

11. The method according to claim 8, wherein
the first and second display devices face opposite each other on an upper space of a checkout counter.

12. The method according to claim 8, wherein
the information for supporting execution of the second job includes a button image for receiving an input relating to execution of the second job.

13. The method according to claim 8, further comprising:
performing an accounting transaction based on data input via the first display device and an amount of money deposited into the change machine;

printing details of the accounting transaction on a transaction receipt; and issuing the transaction receipt through an issuance port that faces the second direction.

14. The method according to claim 8, further comprising:
when the first touch input is made to start the first job,
scanning a barcode;
determining whether a code corresponding to the barcode coincides with an identification of the operator, and
preventing execution of the first job for dispensing money when the code corresponding to the barcode does not coincide with the identification.

15. The method according to claim 8, wherein the first job includes replenishing
the change machine with cash.

16. A non-transitory computer readable medium containing a program for controlling an accounting device having device, a first display device that faces a first direction towards an operator and includes a touch panel, a second display device including a touch panel and facing a second direction different from the first direction, and a change machine for receiving or dispensing money, the change machine facing the second direction, the program causing the accounting device to perform a method comprising:
receiving a first touch input via the first display device;
determine whether the first touch input is made to start a first job performed on the change machine, or to start a second job other than the first job;
when the first touch input is made to start the first job, displaying a first button on the second display device,
when a second touch input is made on the first button displayed on the second display device, enabling the change machine to receive or dispense money, and displaying a second button for completing the first job on the second display device, and
when a third touch input is made on the second button displayed on the second display device, disenabling the change machine from receiving or dispensing money; and
when the first touch input is made to start the second job, displaying information for supporting execution of the second job on the first display device.

17. The non-transitory computer readable medium according to claim 16, wherein
the method further comprises, when the third touch input is made on the second button displayed on the second display device, printing a receipt indicating the money received or dispensed by the change machine.

18. The non-transitory computer readable medium according to claim 16, wherein
the change machine has a depositing port for receiving money and a dispensing port for dispensing money, both of which face the second direction.

19. The non-transitory computer readable medium according to claim 16, wherein
the method further comprises, when the first touch input is made to start the first job,
scanning a barcode,
determining whether a code corresponding to the barcode coincides with an identification of the operator, and
preventing execution of the first job for dispensing money when the code corresponding to the barcode does not coincide with the identification.

20. The non-transitory computer readable medium according to claim 16, wherein
the first job includes replenishing the change machine with cash.

* * * * *